C. A. BICKETT.
MACHINE TOOL.
APPLICATION FILED MAR. 16, 1918.
1,312,297.
Patented Aug. 5, 1919.
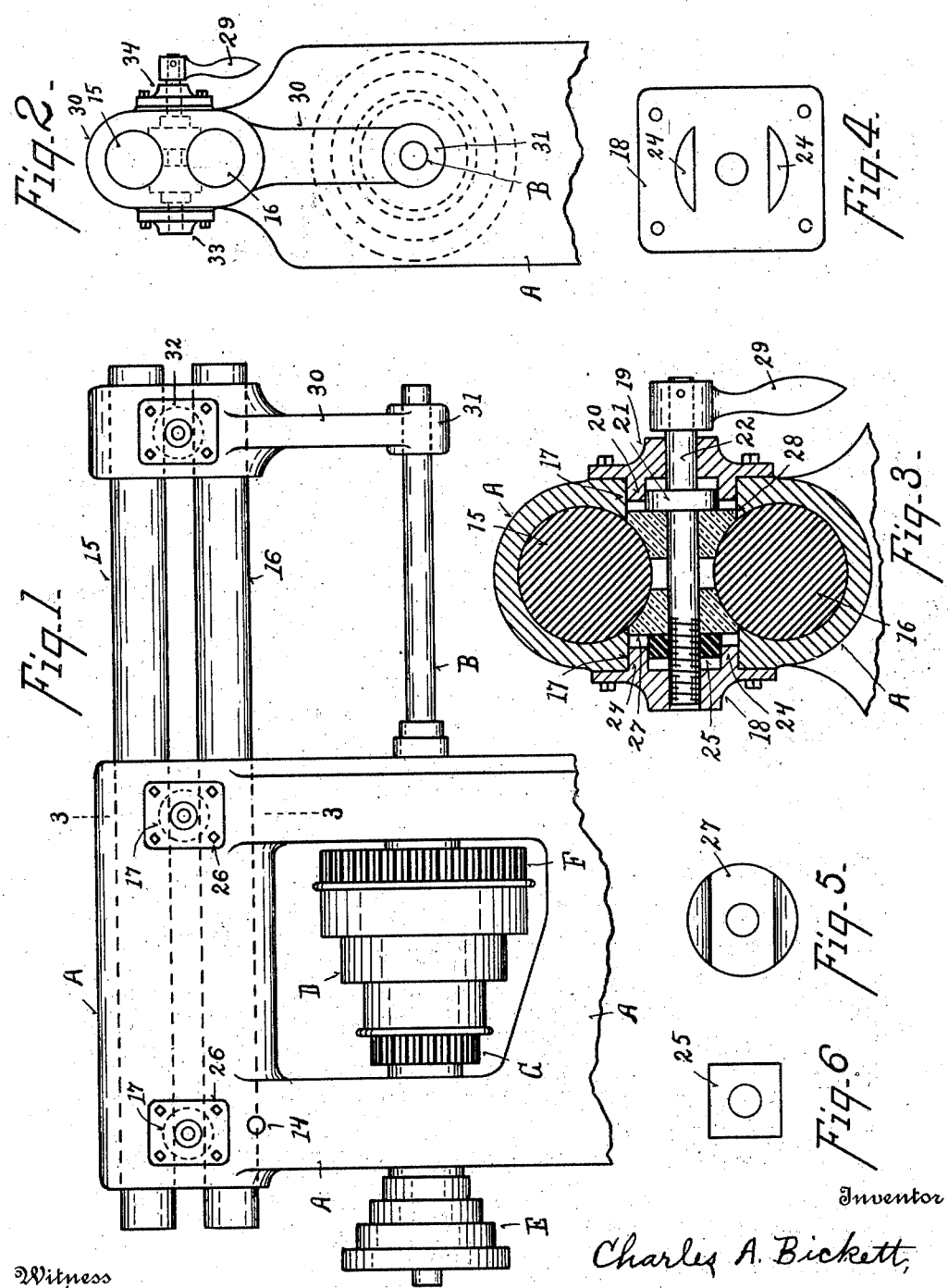

UNITED STATES PATENT OFFICE.

CHARLES A. BICKETT, OF CINCINNATI, OHIO.

MACHINE-TOOL.

1,312,297. Specification of Letters Patent. Patented Aug. 5, 1919.

Application filed March 16, 1918. Serial No. 222,861.

*To all whom it may concern:*

Be it known that I, CHARLES A. BICKETT, a citizen of the United States, residing at Cincinnati, in the county of Hamilton and State of Ohio, have invented certain new and useful Improvements in Machine-Tools, of which the following is a specification.

My invention relates to improvements in milling machines, gear cutters and similar tools. One of its objects is to provide an improved and rigid supporting means for the spindle out bearing hanger for heavy duty purposes. Another object is to provide an improved and adjustable supporting means adapted by simple adjustments to use for both light and heavy duty purposes. Another object is to provide a supporting means to rigidly and firmly support the out bearing hanger in alinement with the main spindle bearings for heavy duty purposes and to provide for a quickly adjustable less rigid support for light duty purposes. Another object is to provide for economies in material and labor of production with improvement in quality. My invention also comprises certain details of form, combination, and arrangement, all of which will be fully set forth in the description of the accompanying drawings, in which:

Figure 1 is a side elevation of the upper portion of a milling machine embodying my improvements.

Fig. 2 is an end view of the same.

Fig. 3 is a sectional detail on line 3—3 of Fig. 1.

Fig. 4 is an inside plan of one of the clamp supporting brackets detached.

Fig. 5 is a plan of one of the clamping jaws detached.

Fig. 6 is a plan of a clamping nut detached.

The accompanying drawings illustrate the preferred embodiment of my invention, in which A represents the main frame of a milling machine. B represents the spindle on which either rotary cutters or work members may be mounted. An adjustable work table of usual construction is contemplated to be employed, but is not shown in the illustration. The spindle is adapted to be rotated at different speeds over a wide range by means of cone pulleys D and E and back gear mechanism F and G. Any desired type of spindle driving mechanism may be employed which provides for a sufficient range of speeds.

Two over-arms 15 and 16 are provided, located one above the other preferably with their axes in one plane, and also in one plane with and vertically above the spindle. The over-arms are mounted in separate bores in the main frame. Each of said over-arms may be independently adjustable endwise in its bore in the main frame, but this is not essential to the carrying out of my invention, as it is only desirable that one of said over-arms be adjustable endwise relative to the main frame, hence if desired one of said arms, for instance arm 16 may be locked against adjustment endwise relative to the main frame by means of a pin or key 14.

Near each end of the main frame is a cylindrical recess 17 through the main frame from one side to the other. On one face of the main frame the recesses 17 are closed by means of face plates 18 and on the opposite face by means of face plates 19. The plates 19 have each a cylindrically dressed section 20 to enter and closely fit the cylindrical bore 17, and a counter recess to receive and guide a collar or integral projection 21 on the clamping bolt 22. The plate 18 has projections 24 which closely fit the bore 17 on their exteriors, and which receive between them and embrace a clamping nut 25 so as to prevent rotation of said nut. The nut 25 is threaded to one end of the clamping bolt 22, and the threaded end of the clamping bolt is journaled and supported in the central bore of the plate 18. The face plates 18 and 19 when assembled are held in place by means of bolts or cap screws 26.

Clamping jaws 27 and 28 are mounted upon the clamping bolts and interposed between projections 21 and nuts 25 so that rotation of the clamping bolts in one direction by means of their hand levers 29 will draw the clamping jaws 27 and 28 together and cause them to firmly grip either or both of the over-arms to lock them to the main frame. When the clamping bolts are rotated in the opposite direction, the clamping jaws are released and one or both of the over-arms may be adjusted endwise.

The spindle out bearing hanger 30 is provided with separate bores to receive the over-arms 15 and 16 and is supported by means of one or both of said over-arms. At its lower end the hanger 30 is provided with a bearing 31 to rotatably support the outer end of the spindle. The hanger 30 is provided with a cylindrical recess 32 similar to the recess 17, and face plates 33 and 34 similar to plates 18 and 19, and with clamping mechanism such as heretofore described for clamping the over-arms to the main frame. Said clamping mechanism serves to clamp the hanger 30 to any desired position of adjustment relative to one or both of the over-arms.

In practice the recesses 17 and 32 are first faced and bored and the face plates and clamping mechanism assembled in position and the clamping jaws blocked rigidly in position, after which the recesses or bores to receive the over-arms are bored, including the clamping faces of the jaws. By providing duplicate clamping mechanism on the main frame and hanger to clamp the over-arms with firmness and accuracy, a considerable economy in construction is effected.

For heavy duty work both over-arms are employed to support the hanger 30, the hanger is self centering, and a trussed effect and great rigidity in the support of said hanger are attained. For light duty work where frequent changes in the adjustment of the hanger 30 are desired, or where it is desired to adjust the hanger spindle bearing out of engagement with the spindle, one of the over-arms, say for instance the upper one is adjusted endwise relative to the main frame and out of engagement with the hanger 30, thereby leaving the hanger 30 supported by and adjustable relative to one over-arm only. When a single over-arm is employed to support the hanger 30, the center of support is vertically above the axis of the spindle, and the hanger is automatically self centering and may be used with all the advantages of a single over-arm so located.

The mechanism herein illustrated and described is capable of considerable modification without departing from the principle of my invention.

Having described my invention, what I claim is:

1. A machine tool comprising a main frame, a rotary spindle, a plurality of over-arms mounted upon said main frame with their axes in substantially one plane with the spindle axis, one of said over-arms being adjustable endwise relative to the main frame, a spindle out bearing hanger adjustably mounted upon said over-arms, means to rigidly clamp said respective over-arms to the main frame, and means to rigidly clamp said hanger to the respective over-arms.

2. A machine tool comprising a main frame, a rotary spindle, a plurality of over-arms mounted upon said main frame, the axis of one of said over-arms being in a vertical plane with the spindle axis, and the other over-arm being adjustable endwise relative to said main frame, a spindle out bearing hanger adapted to be adjustably mounted upon one or both of said over-arms, means to clamp said over arms respectively to the main frame, and means to clamp said hanger to said respective over-arms.

3. A machine tool comprising a main frame, a rotary spindle, a plurality of over-arms mounted upon said main frame with their axes in substantially one plane with the axis of said spindle, one of said over-arms being adjustable endwise relative to the main frame, a spindle out bearing hanger adapted to be adjustably supported upon one or both of said over-arms, and clamping means common to both of said over-arms to rigidly clamp the respective over-arms to said main frame.

4. A machine tool comprising a main frame, a rotary spindle a plurality of over-arms mounted upon said main frame with their axes in substantially one plane with the axis of said spindle, one of said over-arms being adjustable endwise relative to the main frame, a spindle out bearing hanger adapted to be adjustably supported upon one or both of said over-arms, a transverse recess in the main frame opposite said over-arms, and clamping means detachably mounted in said transverse recess to rigidly clamp the respective over-arms to said main frame.

5. A machine tool comprising a main frame, a rotary spindle, a plurality of over-arms rigidly supported upon and relative to said main frame with their axes in substantially one plane with the spindle axis, a spindle out bearing hanger adjustably mounted and supported upon said over-arms, and means to rigidly clamp said out bearing hanger to the respective over-arms.

In testimony whereof I have affixed my signature in the presence of two witnesses.

CHARLES A. BICKETT.

Witnesses:
  C. W. MILES,
  W. THORNTON BOGERT.